United States Patent [19]
Cullen

[11] Patent Number: 5,950,135
[45] Date of Patent: Sep. 7, 1999

[54] COMMUNICATION SYSTEM WITH TRAFFIC DISTRIBUTION OVER MULTIPLE PATHS

[75] Inventor: John Michael Cullen, Suffolk, United Kingdom

[73] Assignee: British Telecommunications public limited company, London, United Kingdom

[21] Appl. No.: 08/586,712

[22] PCT Filed: Aug. 1, 1994

[86] PCT No.: PCT/GB94/01686

§ 371 Date: Feb. 12, 1998

§ 102(e) Date: Feb. 12, 1998

[87] PCT Pub. No.: WO95/04420

PCT Pub. Date: Feb. 9, 1995

[30] Foreign Application Priority Data

Feb. 12, 1996 [EP] European Pat. Off. .............. 93306049

[51] Int. Cl.[6] .................. H04Q 7/20; H04Q 7/36
[52] U.S. Cl. .................. 455/450; 455/426; 455/445; 455/444

[58] Field of Search .................. 455/426, 445, 455/560, 437, 450, 526, 458, 440; 370/375, 335, 312, 390, 444, 447, 536, 260

[56] References Cited

U.S. PATENT DOCUMENTS

| | | | |
|---|---|---|---|
| 4,383,316 | 5/1983 | Seidel | 370/536 |
| 5,007,052 | 4/1991 | Flammer | 370/312 |
| 5,058,201 | 10/1991 | Ishii et al. | 455/437 |
| 5,103,444 | 4/1992 | Leung et al. | 370/312 |

*Primary Examiner*—Wellington Chin
*Assistant Examiner*—Keith Ferguson
*Attorney, Agent, or Firm*—Nixon & Vanderhye P.C.

[57] ABSTRACT

A telecommunications network made up of a plurality of bearer links and a plurality of nodes, is disclosed. According to the present invention, at least some of the nodes have elements configurable to allow signals arriving over one link to be retransmitted over more than one link, and/or at least some of the nodes have elements configurable to allow signals arriving over different links to be combined for retransmission over a single link, thereby permitting traffic to be carried between the two end point nodes a plurality of routes simultaneously.

29 Claims, 7 Drawing Sheets

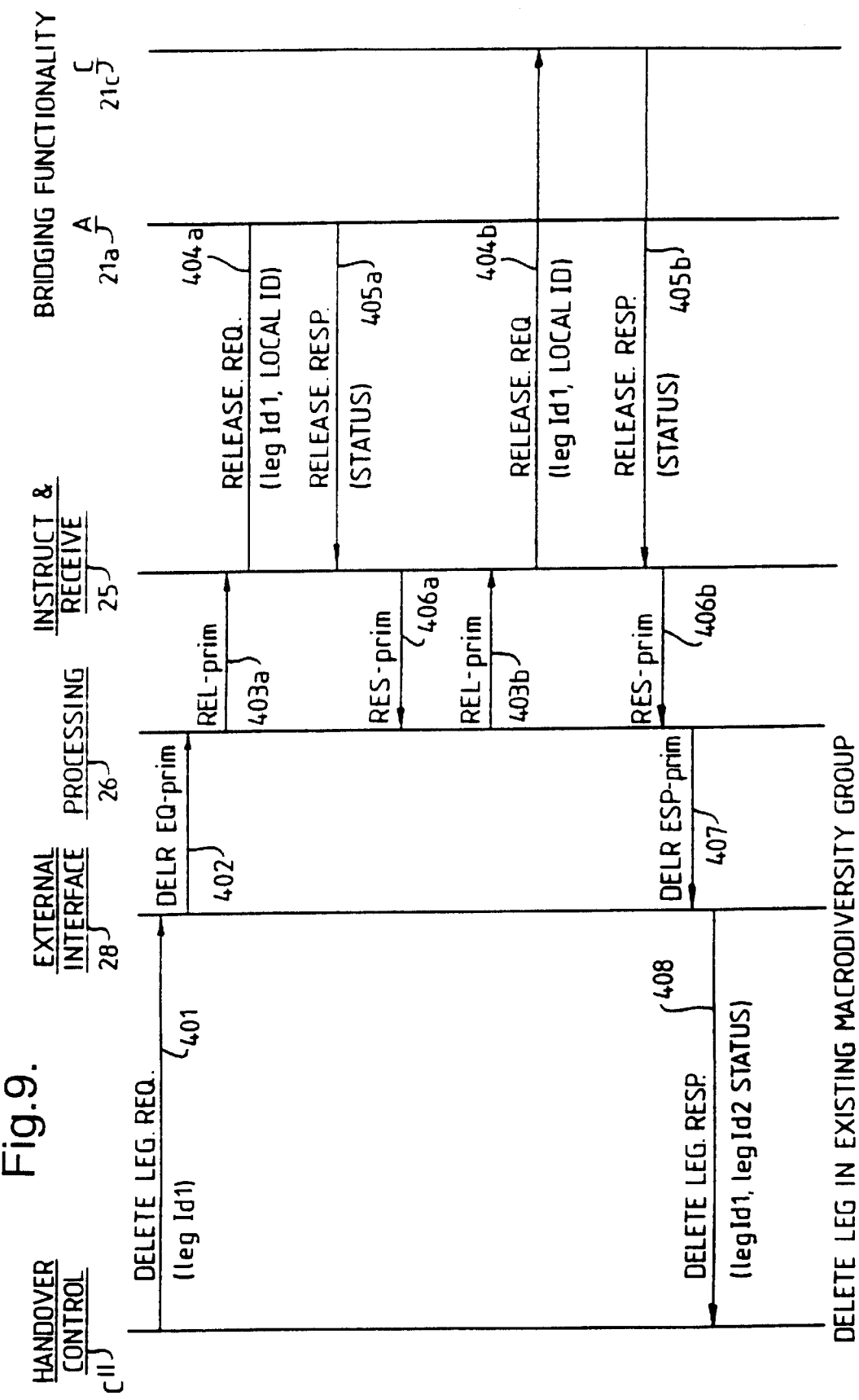

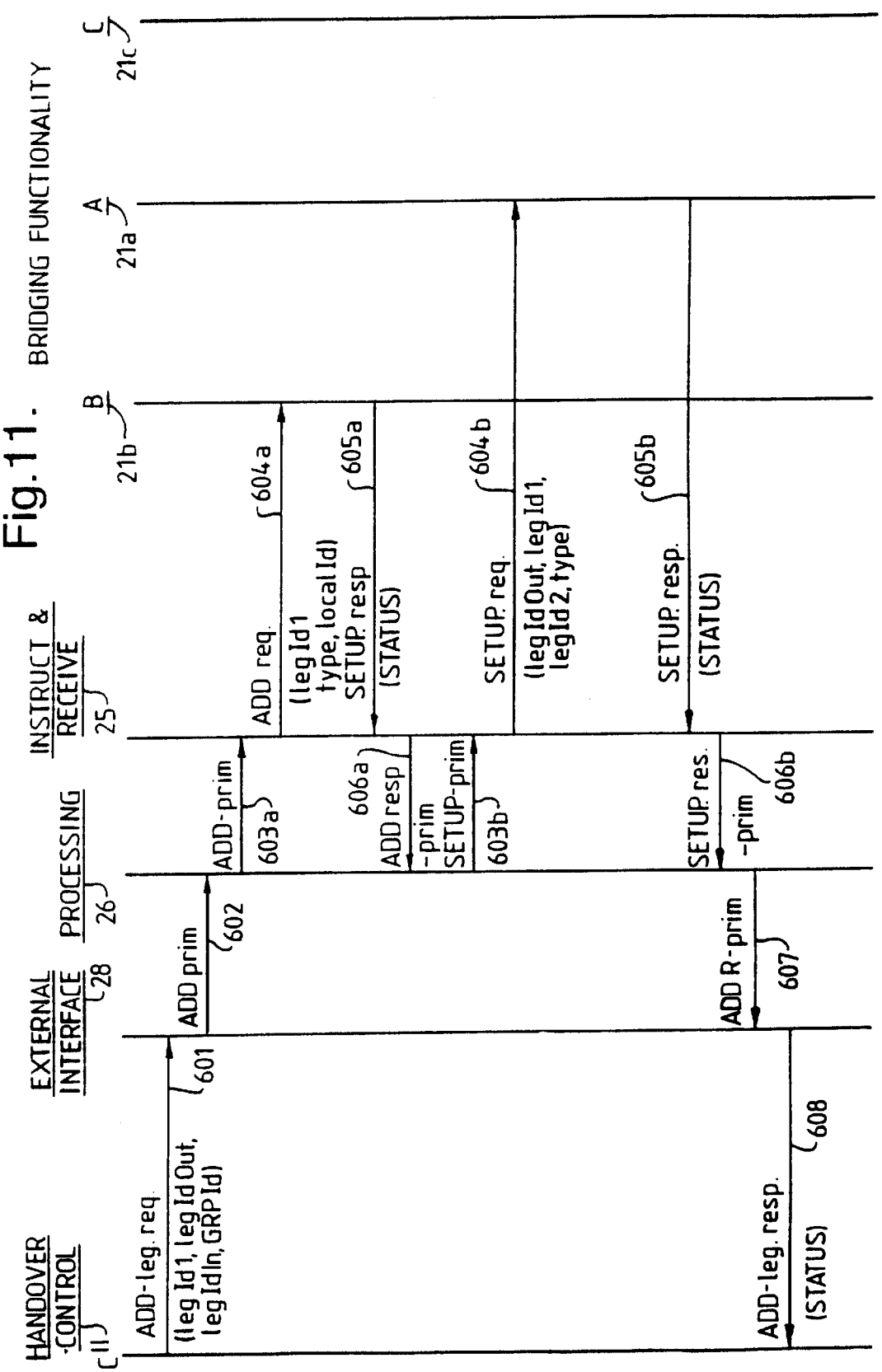

COMMUNICATION SYSTEM WITH TRAFFIC DISTRIBUTION OVER MULTIPLE PATHS

This invention relates to the operation, monitoring and control of a communications system. In particular it relates to operation of telecommunications networks, but is not limited to such systems.

In this specification the term 'functional element' is used to define an element of a communications system which performs some function, e.g. a switching or monitoring function, to the system itself, as distinct from an 'application process element' which controls a number of "Functional elements" to achieve a high level function, usually requiring concerted action from several functional elements. This high-level function may be a network application such as a handover process in a mobile radio system.

In a telecommunications network the functional elements of the system are widely distributed. For example, switching functionality is required at nodes throughout the system. However, in conventional telecommunications networks application process control is concentrated, requiring a large signalling load to be carried over the telecommunications network. Despite the distributed nature of the system all elements of the network which interact must have compatible signalling formats. This is a particular problem in a cellular radio network, where mobile units made by a number of different manufacturers can turn up anywhere in the system and have to interact consistently with whichever fixed part of the network they happen to have established communication with. In such a network it is difficult to arrange for enhancement or improvements, because of the need for all signalling formats to remain compatible.

Further problems arise in known systems because of the need for measurements of network conditions e.g. link performance to be made, and the results transmitted to a control centre, either continuously or discontinuously depending on the nature of the measurements to be made and the purpose for which they are required. This places an additional signally overhead on the network. Many measurements are often only require in specific operating circumstances. It is therefore wasteful of signalling capacity for all possible data to be transmitted when much of it is redundant. The limited signalling capacity and the number of different measurements to be made also reduce the resolution of the measurements and/or the sampling rate that can be supported.

A further limitation on capacity in conventional systems is caused by limited routing capabilities. Particularly in a case where a call requiring very high bandwidth or data rate is required, there may be no single route available through the network allowing such capacity. This may be the case even if it is possible to re-route calls in progress without interruption in order to provide greater capacity on a particular link. In these circumstances, a call requiring a higher bandwidth would either fail or cause another lower priority call already in progress to fail, although the system as a whole does have sufficient capacity.

Existing telecommunication systems normally permit single links from point to point only. If the link is unreliable, error checking processes may be employed but these require additional data in order to perform the error checking. It is known for mobile units to monitor more than one base station simultaneously, in order to identify the one with the best quality signal. However, in a conventional switched network, because the switching and control of the call are indivisible, the call is handled over a single route only.

It is also known for a transmission to be shared between a number of routings such that different parts of the information are transmitted over different routes. For example alternate timeslots of a time division transmission could be sent by different routes. This allows a transmission to be made even though no one routing has sufficient capacity for the transmission. However, the transmission quality will only be as good as the worst of the various routings selected, and a failure of any one route would cause the failure of the transmission as a whole.

According to a first aspect of the invention there is provided a telecommunications network for carrying signals conveying information, the network comprising a plurality of bearer links connecting a plurality of nodes, wherein at least one of the nodes has a multicasting element configurable to allow the information conveyed in a signal arriving at the node over one link to be re-transmitted in further signals over more than one link, and at least one of the nodes has a combining element configurable to allow signals arriving over different links to be combined for retransmission of their information content in a signal over a single link, so permitting signals conveying the same information to be carried between the two end point nodes over a plurality of routes simultaneously.

According to a second aspect of the invention, there is provided a method of operating a telecommunications network comprising a plurality of bearer links connecting a plurality of nodes, wherein signals conveying the same information are transmitted from a first node to a second node by at least a first path and a second path, the first and second paths comprising different bearer links, the signals received at the second node being recombined for onward transmission of the information conveyed therein. According to a third aspect of the invention, there is provided a multicasting element for a telecommunications network having one input link and a plurality of output links, configurable to allow information conveyed in a signal arriving over the input link to be re-transmitted over the plurality of output links.

According to a fourth aspect of the invention, there is provided a combining element for a telecommunications network having one output link and a plurality of input links, configurable to allow signals carrying the same information arriving over the input links to be combined such that the information can be conveyed in a signal transmitted over the output link.

Dedicated signalling links between the process control units and the network operating units may be provided. Where the system being controlled is a telecommunications network, the signalling may be carried over the traffic bearer links of the network. The process control elements need not be located at a node of the bearer network. Using the telecommunications network example, process control can be located at any point in the network, and for different functions may be located at different points.

Embodiments of the invention will now be described, by way of example and with reference to the accompanying drawings, wherein.

Figure 2:
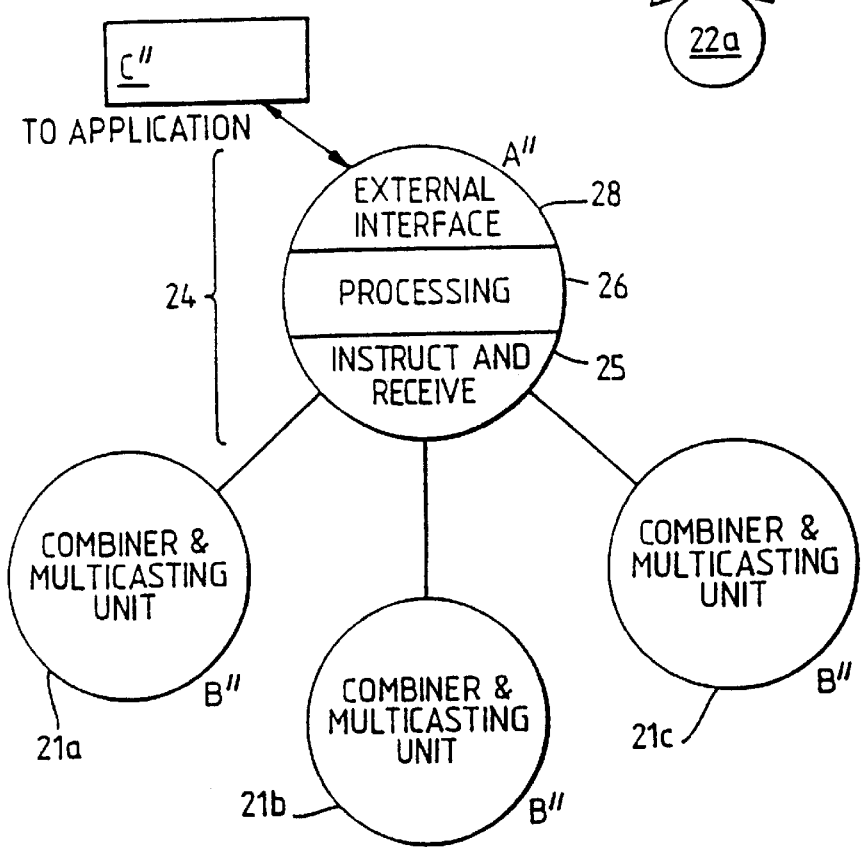
FIG. 2 shows the network of FIG. 1 in functional terms.
Figure 3:
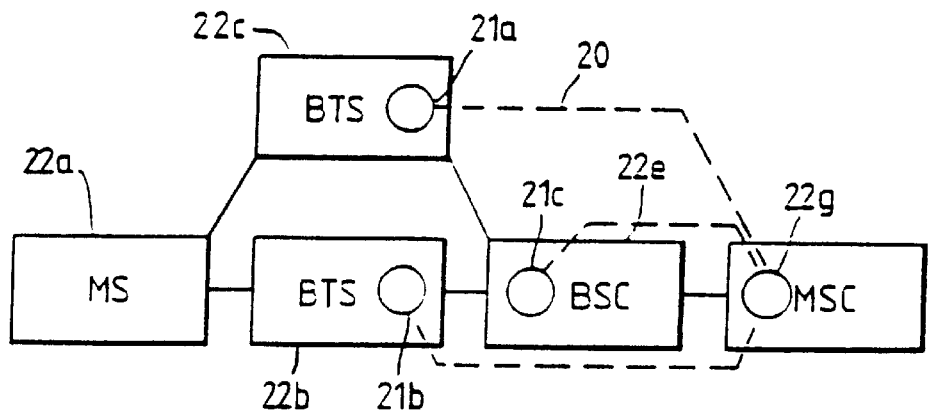
FIG. 3 shows schematically a mobile radio network embodying the topology of FIG. 1 and functional aspects of FIG. 2.
Figure 6:
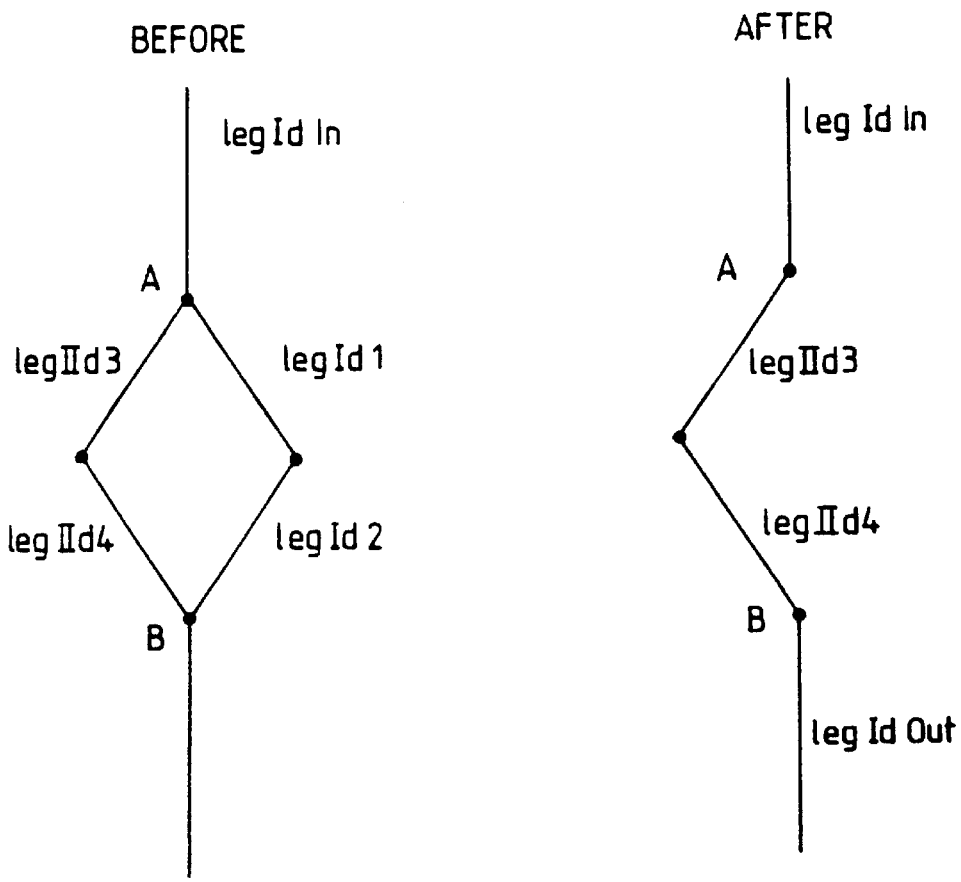
FIGS. 6, 7 and 8 illustrate three possible changeovers in a diversity control system.
Figure 8:
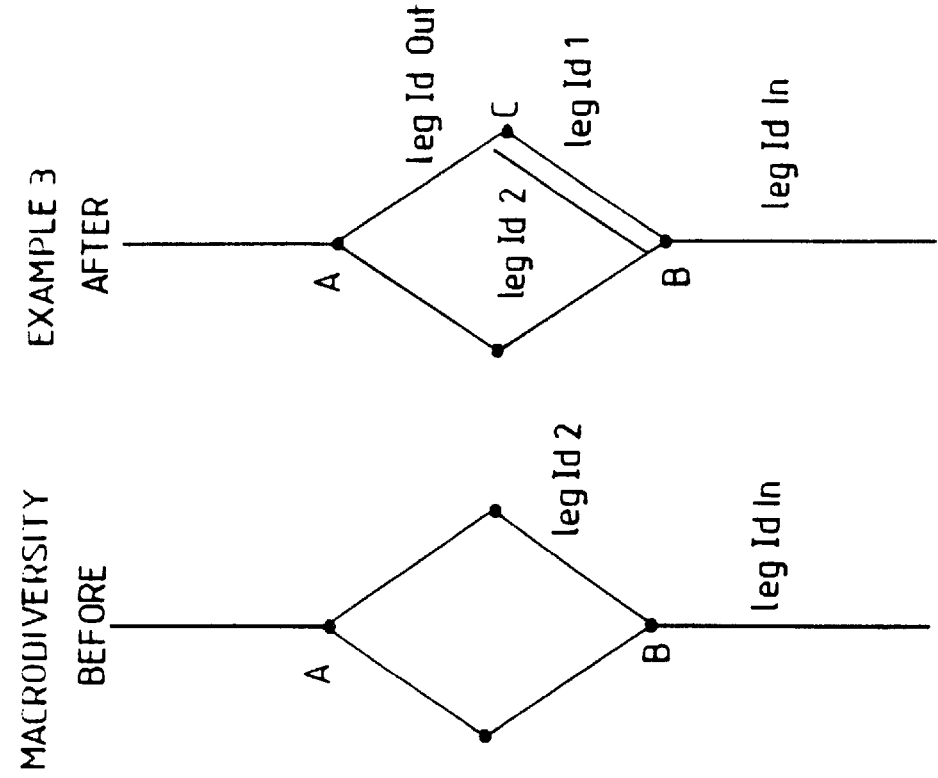
Figure 7:
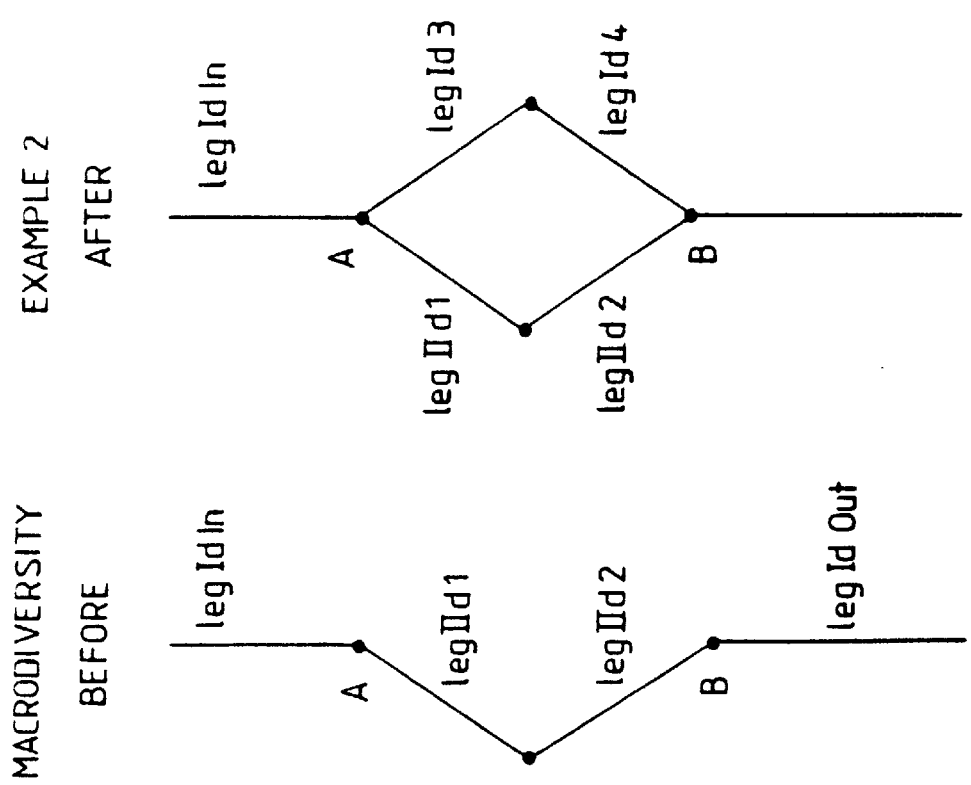
Figure 10:
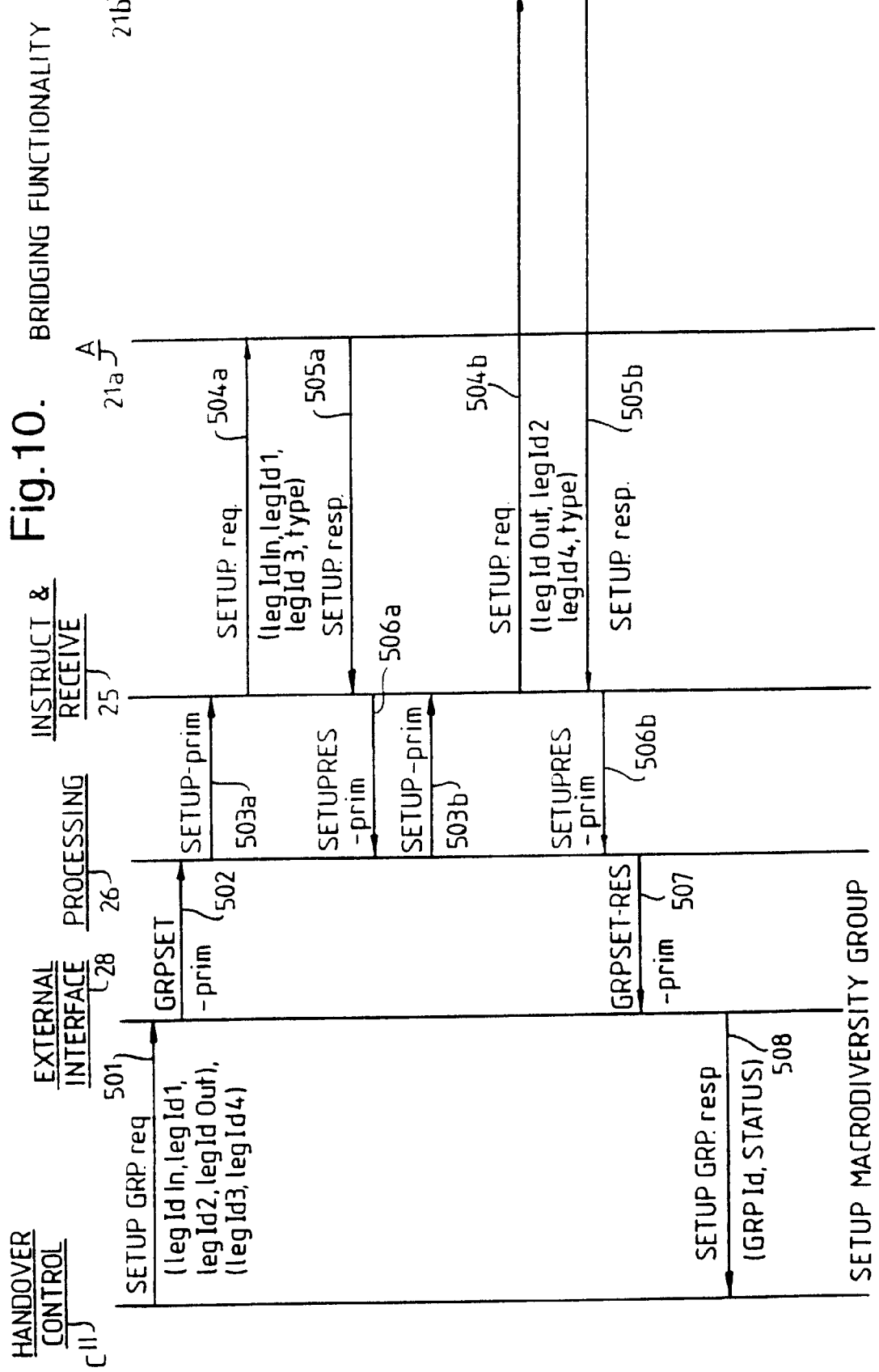

FIGS. 9, 10 and 11 are flow charts illustrating the data flows taking place within the embodiment of FIGS. 2 and 3 in order to control the system of FIGS. 6, 7 and 8.

An embodiment of this invention is a communications system having a multicasting and/or combining function. As shown topologically in FIG. 1, nodes 22a–22g are distributed throughout a network 20. An incoming signal to a network node eg. 22e can be forwarded to more than one further node 22b, 22c (ie. multicasting) or conversely two incoming signals having arrived at the same point 22e by different routes (from 22b, 22c) can be combined together for onward transmission. In a mobile radio system the air interface may form one or more of the bearer links so that a mobile unit, (e.g. 22a) can be linked with more than one base station (22b, 22c, 22d) simultaneously. The combining and splitting functions need not take place at the air interface, e.g. nodes 22e, 22g.

By arranging for signals to travel by more than one route problems which may be caused by faults in the network can be overcome. For example, if a signal is received over a single link eg. that between nodes 22b and 22 e, which may be unreliable, there is no way of telling whether the data is correct or not, nor is there any way of correcting it even if it is known to be incorrect, other than by using error correction protocols requiring extra bits in the bit stream. By also receiving signals from a second link between nodes 22c and 22e, the signals can be compared, and if they are identical there will thus be greater certainty that the data stream has not been corrupted. If they are different then error correction processing can request a repeat of that part of the bit stream. Weighting factors can be introduced if it is known that one link is more reliable than another.

Other possibilities occur with a greater number of paths. For example, with three paths should a binary digit in one of the bit streams differ from the corresponding digit in each of the other two then it can be assumed that the two identical streams are correct and the third one is wrong.

The functionality described below allows both diversity over the air interface, where a mobile unit (e.g 22a) may be in contact with more than one base station (22b, 22c, 22d) simultaneously, and also diversity across the network, allowing routing over a plurality of (parallel) bearer paths. This is in distinctions to known systems in which should there be insufficient capacity for the required signal to be sent over any single bearer, it is possible to use several paths each of lower capacity and each handling part of the data stream are used. The problem with such an arrangement is that the failure of any one path causes the failure of the link as a whole. By sending the whole signal over all paths, the link is made more robust even though the quality of signal over any single bearer may be reduced.

At each node there is a multicasting and/or combining unit. These are controlled by a process unit described below. This allows greater diversity within the system as multicasting is available throughout the network instead of only at predetermined control points as is possible with existing arrangements.

FIG. 3 shows a physical realisation of this embodiment in a mobile radio network. The multicasting/combining function is carried out using units of three types. Within each base station 22b, 22c, base site controller 22e, and at the central mobile switching centre 22g, is a combiner and multicasting unit 21a, b, c which has the capability, on receiving instructions from the processing unit 24 in the mobile switching centre 22g, to set up any bearer links that are required. Since these units 21a, 21b, 21c are integral parts of the base stations, their mode of operation, and the data handling formats involved, will vary from unit to unit. Instructions to them may be sent over the bearer network itself, or may be sent over dedicated links direct from the processing unit 24.

The multicasting units 21a, b, c each take one logical incoming channel and distribute the signal to one or more logical channels in real time. In order to perform multicasting the unit must have information about the incoming logical channel which is to be distributed and to which logical channels it should be distributed. The combiner unit performs the converse. It combines several logical channels onto one logical channel. This combination may take the form of selective combination, in which the signals from the incoming logical channels are compared and the transmitted result depends on the respective qualities of the signals.

The multicasting/combining functional units do not need to be located at the same point as the multicasting and combiner application process unit 24, which can control multicasting and combiner units 21a, b, c throughout a large part of the network.

The operation of the system of FIG. 3 will now be further described with reference to FIG. 2 which illustrates the system in functional terms. In particular combining and multicasting functionality $B^{11}$ corresponds to combiner/multicast units 21a–c, and processor function $A^{11}$ corresponds to process controller 24. The processing function $A^{11}$ itself is in three parts. Communicating with the combiner and multicasting functionality $B^{11}$ is an instruct-and-receive module 25. This receives data from each multicasting functionality (21a, b, c) and translates all such received data into a single processing data format that can be handled by a processing module 26. Conversely instructions from the processing module 26 are handled by the instruct-and-receive module 25 and converted into formats which can be handled by the individual combiner and multicasting units 21a, b, c.

The instruct and receive module 25 is function operating in accordance with the combiner and multicasting function $B^{11}$ with which it communicates. A separate element of the unit 25 handles the format specific to each multicasting function 21a, b, c. These elements may be time slots in the operating sequence or data streams carrying addresses associated with the individual units. The signals sent from the combiner and multicasting unit $B^{11}$ to the processing unit $A^{11}$ include confirmation that instructions sent to the units $B^{11}$ have been successfully carried out, or error messages to indicate that the instruction has failed for some reason. Such a message might be that the unit 21a, b, c corresponding with the function $B^{11}$ has all its connections in use and no further connections can be made.

An associated application $C^{11}$ sends instructions to the process control unit $A^{11}$ requiring the addition of a new path, or the release of a path which is no longer required, for example because the call has terminated or because a handover has taken place. Process control unit $A^{11}$ performs this operation through the appropriate combiner/multicaster units $B^{11}$, and returns a response to application $C^{11}$ indicating that the requests have been performed successfully. Error messages are transmitted if this is not the case.

The commands and response sent between the application $C^{11}$ and the external interface module 28 are the same regardless of which bearer link (and thus which combiner multicasting units $B^{11}$) is concerned. The processing unit $A^{11}$ handles any conversions of data format required. This means that the application $C^{11}$ can send signals to the process controller $A^{11}$ which are identical in all respects except for the identity of the bearer link to be set up or deleted. It is to be noted that to set up a bearer link it is necessary to use functionality at the nodes at each end of that link. Therefore the processing unit $A^{11}$ will normally respond to any instruction from the application platform $C^{11}$ by sending instructions to two combining and multicasting functions $B^{11}$ corresponding to the nodes 21a, 21b, 21c required. The selection of these functions can be carried out in the processing unit $A^{11}$ or by the application $C^{11}$.

The functions of processing unit $A^{11}$ may include the determination of appropriate timing delays in order that the signals arriving by different routes are properly synchronised. Since the bearer links may be different length, and particularly if the links involve passing through different numbers of nodes on each of the two routes, each of which may involve coding delays, then it is unlikely that the two signals would arrive in synchronisation unless special arrangements are made to achieve this.

The application $C^{11}$ may require changes to the links arranged in combiner/multicasting units $B^{11}$ in response to changes in demand to the system, in order to maximise the utilisation of the capacity of the network.

In a mobile radio system, the number of bearer links required to support a mobile unit may vary as the signal quality changes in response to movement of the mobile unit.

The mobility application function $C^{11}$ consequently instructs process control unit $A^{11}$ to change the number of bearer paths, usually in response to a detection of a decline in quality of the existing interface link. The mobility application platform $C^{11}$ may therefore instruct the process control unit $A^{11}$ to add a second bearer link taking an alternative route in order to improve the reliability of the link should the quality of the signal over the first link drop below a certain level. However, the opportunities for multicasting and combining paths are obviously greater when there is a small amount of traffic on the system. Therefore, if the traffic level increases it may be necessary for the mobility multi-casting function $C^{11}$ to reduce the number of paths used by a particular call in order to handle all the traffic falls then more bearer links become free and can be reallocated to increase diversity for the remaining calls.

Multicasting and combining, although the functions are complementary, may exist as separate functions in one or more units not necessarily even at the same location. For a call in which data is travelling in both directions it is obviously necessary to have common network terminations, but it is possible for the two directions of data flow to pass over quite different combinations of bearers, so that the upstream and downstream paths or plurality of paths are not coincident e.g. in FIG. 1 up via nodes 22a, 22b, 22e, 22g; and down via nodes 22g, 22f, 22d, 22a. However, in a more typical case, a multicasting unit in the upstream direction corresponds topologically with a combining unit in a downstream direction and vice versa.

FIGS. 6, 7 and 8 illustrate three possible changeovers in a simple diversity control system.

FIGS. 9, 10 and 11 are flow charts illustrating the data flows taking place within the system of FIGS. 2 and 3 in order to control the system of FIGS. 6, 7 and 8. In each of FIGS. 6, 7, and 8 the left hand part shows the initial state and the right hand part the final, desired, state. Bridging functionality is used in this embodiment to effect the multicasting and combining functions.

In FIG. 6 a connection between points A and B (leg Id 1, leg Id 2) is to be released, leaving a single connection (leg IId 3, leg IId 4) between those points. Conversely in FIG. 7 a second connection (leg IId 1, leg IId 2).

In FIG. 8 a second connection leg Id 1 is added in parallel to an existing bearer link leg Id 2 between the same two nodes B, C thus adding a link to an existing group.

Six message formats are available to external application $C^{11}$. These messages set up "bridges" between bearer links in order to allow combining and multicasting to take place. Thus in this embodiment the combiner and multicasting units 21a, 21b, 21c have bridging functionality. A bridge is required if more than two nodes are interconnected: a simple point-to-point link between two nodes uses only one bearer link and needs no bridging functionality.

The six message formats are:
1) "SetupGrP request"

This message instructs the processing module 26 to form a new bridging group. This message has parameters specifying the constituent legs that form the bridging group and specifies the incoming and outgoing legs. It also identifies the type of bridging to be performed (i.e. selective combining active path, etc.)

2) "SetupGrP response"

This message returns a Group ID (GRP Id) which identifies the bridging group and the status of the bridging group (i.e. active).

3) "Add-Leg request"

This message instructs the processing module 26 to control the addition of an additional leg to an existing bridging group. This message has parameters indicating the leg that should be added to the bridging (Leg ID) and two legs to which the identified leg should be connected and the identity of the bridging group (GRP ID). (The processing module 26 calculates from its own knowledge and this information the legs that require bridging.)

4) "Add-Leg response"

This response is a Status parameter indicating whether the procedure is successful.

5) "DeleteLeg request"

This message instructs the processing module 26 to control the deletion of a leg, identified by the leg ID, from the bridging group, identified by the GRP ID. If the group consequently ceases to exist the group will be deleted.

6) "DeleteLeg response"

The response indicates whether the operation has been successful and whether the bridging group still exists.

Figure 1:
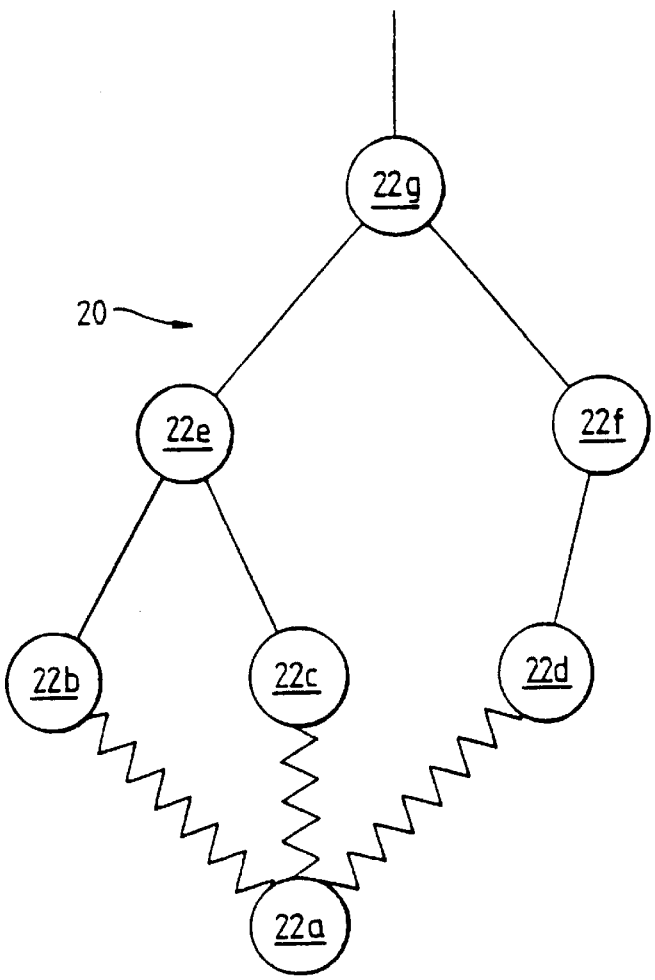
FIG. 1 is a topological diagram of a network according to a first embodiment of the invention.

FIG. 9 shows the operation of the embodiment of FIGS. 1 and 2 to delete a leg from a bridging group. As shown in FIG. 6, the control application requires the dropping of one of the two links between point A and B.

The control application $C^{11}$, in this case the handover control application, sends message 401 for the deletion of a leg or legs, LegId 1, from bridging group GRPID (21a, 21c). The processing unit 26 is informed about what procedure it has to perform, in this case the deletion of a leg from the bridging group, by primitive 402 from the external interface module 28. The processing module 26 then proceeds to delete the leg by contacting each of the remote bridging units 21a, 21c in turn, by messages 403a, 404a and 403b, 404b respectively, and deleting relevant legs from the remote bridging units. If one active leg is deleted from a path, in the example LegId 1 then the algorithm in the processing module 26 will also delete any associated legs that have become unused, in the example LegId 2 (see FIG. 6). When the processing module 26 requires to delete a leg from the bridge controlled by the remote bridge functionality 21a, 21c it transmits to the instruct and receive module 25 a REL primitive, 403a, containing information about the LegId to be deleted and a local identifier uniquely identifying the bridge at the node. The instruct and receiver module then sends a Release request message 404a, in a format that will be recognised by the remote bridging functionality. In this case the format will be relatively simple in that the bridging functionality is assumed to simply delete a leg from a bridge and if the bridge then only has one leg coming in and one leg coming out (i.e. there is only one bearer link remaining so the bridge is no longer required) the bridge is deleted. The response message 405a indicates whether the bridging functionality is still active. On receipt of this message by the instruct and receive module 25, the module issues RES primitive 406a carrying the status to the processing module 26. The processing module 26 then continues to delete any other legs from bridges controlled by other bridging functionality (In the example Combiner 21c) using messages 403b, 404b, 405b, 406b. When the processing functionality 26 has completed deleting legs from bridges it returns a delresp primitive 407 to the external interface module 28 indicating which legs have been deleted (leg ID1, Leg ID2) and the overall status (Status parameter) of the bridging group. The external interface module issues a SetupGrP response 408 containing the parameters includes in the delresp primitive.

FIG. 10 shows the operation of the embodiment of FIGS. 1 and 2 to create a new bridging group. The control application, in this case the handover control application $C^{11}$, asks for the setting up of a bridging group between points A and B (FIG. 7) consisting of the identified legs (LegIDIN, LegID1, LegID2, LegID3, LegID4, LeGIDOUT). This is transmitted in a request message 501.

The processing module 26 is informed about what procedure it has perform, in this case the creation of a bridging group from a collection of legs, by a primitive 502 from the external interface module 28. The processing module 26 then proceeds to create bridges, controlled by bridging functionality, 21a, 21b, 21c at nodes where the processing module 26 calculates bridging needs to created. When the processing module 26 requires to set up a bridge using the remote bridge functionality 21a, 21b, 21c from a group of legs it issues to the Instruct-and-Receive module 25 an ADD primitive 503 containing information about the LegIds required to form the remote bridge at a node, to the instruct and receive module 25. The instruct and receive module 25 then sends a Setup request message 504a in a format that will be recognised by the remote bridging functionality 21a. In this case the format will be again relatively simple in that the bridging functionality 21b is assumed to simply create a bridge. The format specifies the legs that are to form a bridge and the type of bridge required. The response message 505a indicates whether the bridging functionality 21b is active or the operation has failed. On receipt of this message by the processing module 26 carrying the status, the processing module 26 then continues to form any other bridges required. (In the example bridging functionality 21b). When the processing module 26 has completed creating bridges it returns a grpsetres primitive 507 continuing a GRPID, allowing simple identification of the bridging group, and the overall status (Status parameter) of the message 508 containing the parameters present in the grpsetres primitive 507.

FIG. 11 illustrates the addition of a leg to an existing bridging group using the embodiment of FIGS. 1 and 2. The control application, in this case the handover control application, sends a request 601 asking for the addition of one or more legs, LegID, to the existing bridging group GRPID. (See FIG. 8). The processing module 26 is informed about what procedure it has to perform, in the case the addition of a leg to an existing bridging group, by a primitive 602 from the external interface module. The processing module then proceeds to add the leg(s) by contacting each of the remote bridging units in turn and adding relevant legs to remote bridging units in forming new bridges. When the processing module 26 requires to add a leg to a bridge controlled by a remote bridge functionality 21b, it issues an add primitive 603a containing information about the LegId to be added and a local identifier uniquely identifying the bridge at the node, to the instruct and receive module 25. The instruct and receive module 25 then sends and Add request message 604a in a format that will be recognised by the remote bridging functionality 21b. In this case the format will be again relatively simple in that the bridging functionality 21b is assumed to simply add a leg to a bridge and hence requires only the legId and the local bridge reference. The response message 605a indicates the status of the bridge (i.e. active or not active). On receipt of this message by the instruct and receive module 25, the module issues an address primitive 606a to the processing module carrying the status. The processing module then continues to either add new legs to bridges controlled by other bridging functionality 21b or to setup a new bridge (In the example a SETUP request 604b is sent to bridging functionality 21a). (Messages 603b, 604b, 605b, 606b). When the processing functionality has completed adding legs to bridges or creating new bridges it returns a primitive 67 to the external interface module 28 indicating the overall status of the add operation. The external interface module 28 issues a AddLeg response 608 containing the parameters included in the primitive 607.

Figure 4:
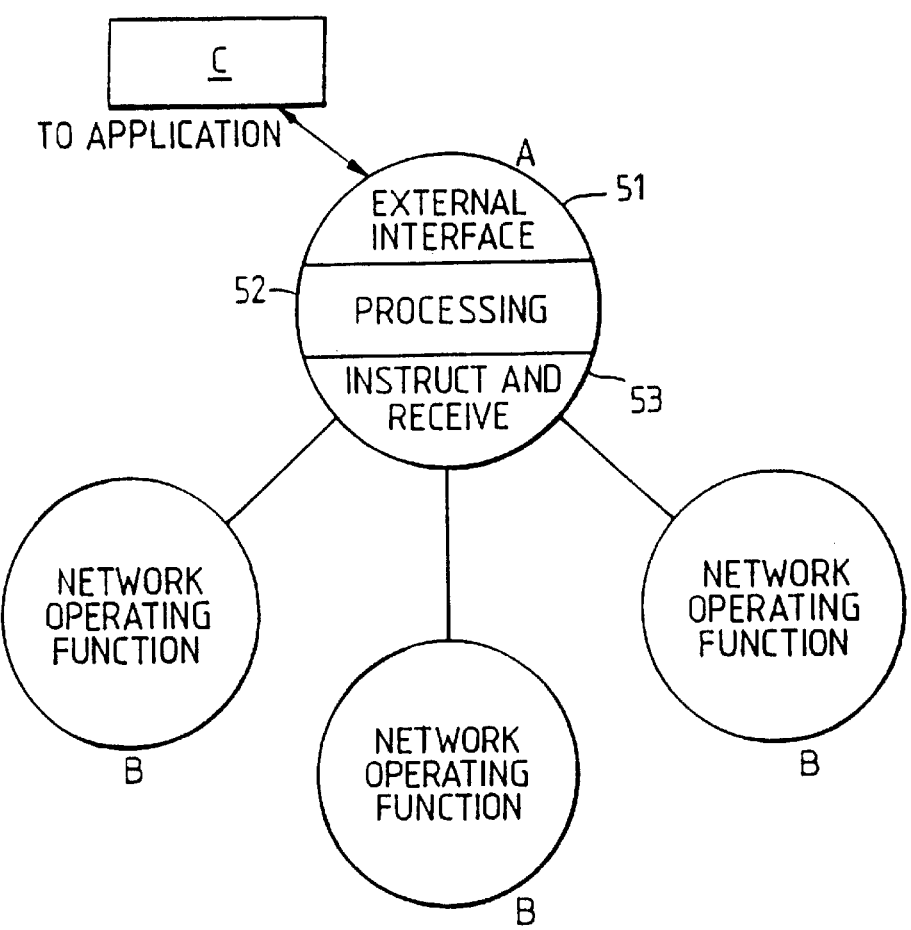
FIG. 4 is a functional representation of a generalised system according to a second embodiment of the invention.

In a second embodiment of the invention, a communications system, shown in FIG. 4 in functional terms, comprises a telecommunications network incorporating an intermediate processor function A interconnecting functional elements in the form of network operating functions (NOFs) B, with an application C. The intermediate processor function A has three functional modules: an external interface module 51, processing module 52, and instruct and receive module 53.

In operation, processor function A relays data between NOFs B and application C in both directions. The application is a diversity control function and the data may be, for example, control messages going from application C to NOFs B, or measurement or status data going from NOFs B to application C.

Processor function A performs three functions. Instruct and receive module 53 sends instructions and data to, and receives data from, the individual network operating function elements. External interface module 51 interfaces with the application C. These two modules 51, 53 are linked by the processing module 52 which, for example, translates (a) instructions from the application C into the individual instructions for NOF B, and/or (b) data receive from the NOF B into a data format suitable for the application platform C.

Although FIG. 4 has been illustrated for a single application for simplicity, there may be a plurality of applications interconnected with respective or common NOFs by respective or common processing units, as will be seen from the following description of various other embodiments of the invention.

In processing unit A, the external interface module 51 provides a common interface to application platform C. This interface offers the application platform C a set of available commands that processing module 52 can perform independent of the interface to the network operating functions B.

The processing module 52 performs the conversion of application information data into information specific to the individual NOFs, and/or performs the conversion of NOF information into a form suitable for the application platform C.

The instruct and receive (IR) module 53 communicates with the NOFs B, and may have different interfaces to different NOF units in the network. The IR module 53 converts between primitives used by the processing module 52 and information message formats used by NOFs B.

Instead of, or in addition to, the conversion or translation described, the processing module 52 may also perform additional processing specified by application platform C. The NOFs B may take the form of functionality associated with the network, e.g. embedded software, or they may be discrete elements, units or modules e.g. monitoring elements or network control functions.

Similarly, the applications platform C may be a function or functionality embedded in the network, e.g. in a service control point or it may be embodied in a stand-alone application platform.

Figure 5:
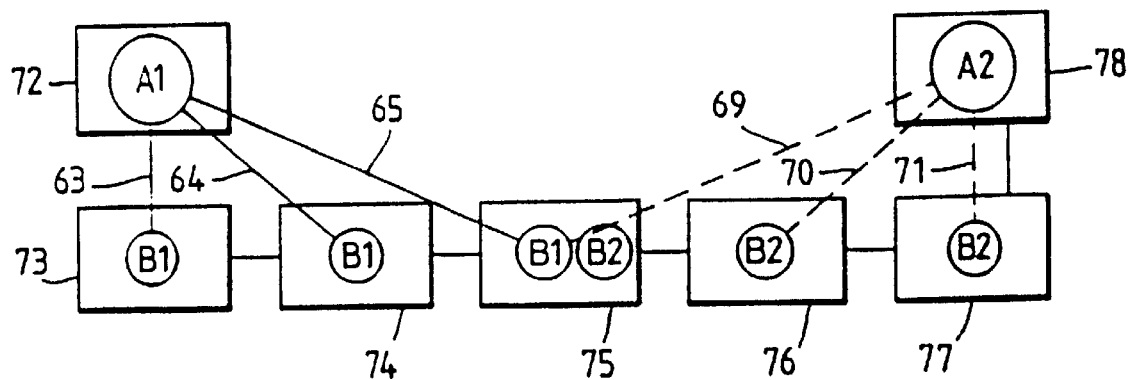
FIG. 5 is a schematic diagram of a network architecture incorporating the functionality of the system of FIG. 4.

FIG. 5 illustrates how the generalised system of FIG. 4 may be mapped to a Network Architecture; in this case for a fixed network. In functional terms elements A1, A2 represent application process control functionality and B1, B2 represent network operating functions. Functionality scripted "1" e.g. A1, B1 represents an intelligent network element where Service Control is separated from the switching network and signalling is carried over separate links (63, 64, 65). Functionality scripted with a "2" (e.g. A2, B2) represents elements where all functionality is incorporated in the switching network which carries the signalling information to provide logical links (69, 70, 71). As can be seen from FIG. 5 both the process control functionality and the network operating functionality can be located at potentially any node in the network. These nodes (72 to 78) may be for example service control points, network management centres, switches etc. Important aspects to be noted are that:

(i) process control functionality is located in specific nodes (72, 78) throughout the network.

(ii) secondly, process control functionality for a particular application is fixed in a particular network node, eg process control A1 in node 72, but for different applications or uses of the same application can be located in different network nodes (eg process control A2 in node 78).

(iii) the network operating functions B1, B2 are located at switching network nodes 73 to 77 and are activated by the process control functionality where needed in a real-time dynamic manner. These functions are closely associated with the bearer network.

(iv) a specific use of process control functionality A1 in a particular network node can be to control a network operating function B1 at a network node 75 where there is also present another or the same network operating function B2 under the control of another process control functionality A2.

The data flows in this second embodiment are similar to those shown for the first embodiment with reference to FIGS. 9, 10 and 11.

I claim:

1. A telecommunications network for carrying signals conveying information, the network comprising:

a plurality of nodes, at least one of the nodes including a multicasting element configurable to allow information conveyed in a signal arriving at the node over one link to be retransmitted in further signals over more than one link, at least one of the nodes including a combining element configurable to allow signals arriving over different links to be combined for retransmission of their information content in a signal over a single link, thereby permitting signals conveying the same information to be carried between two end point nodes over a plurality of routes simultaneously.

2. A network according to claim 1, wherein a plurality of nodes have multicasting elements and a plurality of nodes have combiner elements.

3. A network according to claim 1 wherein at least one of the bearer links is over an air interface.

4. A network according to claim 1, the combining elements having means for comparing the quality of the signals on each of the converging routes, and means for onwardly transmitting from that node a signal generated on the basis of the comparison made.

5. A network according to claim 4, in which at least three bearer links converge at a combining element, the combining element having means for comparing the signals arriving over each of the bearer links with each other, and means for selecting, in the event of the signals being different, the signal to be onwardly transmitted on the basis of the signals received from the bearers.

6. A network according to claim 5, wherein the means for selecting the signal to be onwardly transmitted selects the signal received from the greatest number of bearer links.

7. A telecommunications network according to claim 1 wherein the network includes mobile radio units.

8. A telecommunications network according to claim 7 wherein the network is a cellular radio network.

9. A telecommunications network according to claim 7, wherein one or more mobile radio units may be in radio communication with more than one base station simultaneously, and in which as the quality of signals received from a first base station by a mobile radio unit decreases and or the quality of signals from a second base station as received by the mobile radio unit increases, a greater weighting is applied to the signal received by the second base station in determining the signal to be onwardly transmitted.

10. A telecommunications network according to claim 1 wherein the network includes fixed termination points.

11. A telecommunications network according to claim 1 having means for reducing the number of bearer links used for a given call if a greater demand for traffic is placed on the system.

12. A telecommunications network according to claim 1 in which multicasting and combining elements for one direction of traffic are coincident with respective combining and multicasting elements for the reverse direction of traffic.

13. A telecommunications network according to claim 1 in which at least one combining element comprises synchronising means for synchronising the signals incoming from different bearer links.

14. A method according to claim 13 wherein at least one of the bearer links over an air interface.

15. A method according to claim 13 wherein at the node or nodes where routes converge, the quality of the signals on each of the converging routes is compared and a signal generated on the basis of the comparison made is onwardly transmitted from that node.

16. A method according to claim 15, in which at least three bearer links converge at a node, and wherein the signals arriving over each of the three bearer links are compared with each other, and in the event of the signals being different the signal to be onwardly transmitted is selected on the basis of the signals received from the bearers.

17. A method according to claim 16, wherein the comparison is made between the information contents of the signals.

18. A method according to claim 17, wherein the signal selected to be onwardly transmitted is that received over the greatest number of bearer links.

19. A telecommunications system according to claim 15 in which the number of bearer links used for a given call is reduced if a greater demand for traffic is placed on the system.

20. A telecommunications method according to claim 15 in which multicasting and combining elements for one direction of traffic are coincident with respective combining and multicasting elements for the reverse direction of traffic.

21. A telecommunications network according to claim 15 in which at least one combining element comprises synchronising means for synchronising the signals incoming from different bearer links.

22. A telecommunications network according to claim 15 wherein separate parts of data passing from end to end of a call route pass through different bearer links.

23. A method of operating a telecommunications network comprising a plurality of bearer links connecting a plurality of nodes, said network comprising a cellular radio network including one or more mobile radio units, the method comprising the steps of:

transmitting signals conveying the same information from a first node to a second node by at least a first path and a second path, the first and second paths comprising different bearer links;

receiving the signals at the second node; and recombining the signals received at the second node for onward transmission of the information contained therein, wherein one or more mobile radio units may be in radio communication with more than one base station simultaneously, and in which as the quality of signals received from a first base station by a mobile radio unit decreases and or the quality of the signals from a second base station as received by the mobile radio unit increases, a greater weighting is applied to the signal received by the second base station in determining the signal to be onwardly transmitted.

24. A combining element for a telecommunications network having one output link and a plurality of input links, configurable to allow information content of signals carrying the same information arriving over the input links to be combined such that the information can be conveyed in a signal transmitted over the output link, and including means for comparing the quality of the signals on each of the converging routes, and means for onwardly transmitting from that node a signal generated on the basis of the comparison made.

25. A combining element according to claim 24, in which at least three bearer links converge at a combining element, the combining element having means for comparing the information content of the signals arriving over each of the bearer links with each other, and means for selecting, in the event of the information in the signals being different, the information to be onwardly transmitted on the basis of the comparison of the signals received from the bearers.

26. A combining element according to claim 25, wherein the means for selecting the information to be onwardly transmitted selects the information received from the greatest number of bearer links.

27. A combining element according to claim 25, comprising synchronising means for synchronising the signals incoming from different bearer links.

28. A combining element for a telecommunications network having one output link and a plurality of inputs links, said combining element being configurable to allow signals carrying the same information arriving over the input links to be combined such that the information can be conveyed in a signal transmitted over the output link, wherein the output link and input links comprise duplex links, in combination with a multicasting element having one reverse input link corresponding to the output link of the combining elememt and a plurality of reverse output links each corresponding to one of the input links of the combining element, configurable to allow information conveyed in a signal arriving over the reverse input to be re-transmitted over the plurality of reverse output links.

29. A telecommunications network, comprising:

a plurality of bearer links;

a plurality of nodes operatively connected by said bearer links;

a multicasting element included in at least one of said plurality of nodes, said multicasting element being configured to enable a signal arriving at the node over one link to be retransmitted in further signals over more than one link; and a combining element included in at least one node, said combining element being configured to enable signals arriving over different links to be combined for transmission of their information content over a single link, thereby permitting signals conveying the same information to be carried between two end point nodes over a plurality of routes simultaneously.

\* \* \* \* \*